United States Patent
Rojas Lopez et al.

(10) Patent No.: US 10,480,697 B2
(45) Date of Patent: Nov. 19, 2019

(54) QUICK CONNECTOR DETECTION TOOL AND METHOD

(71) Applicant: GM Global Technology Operations LLC, Detroit, MI (US)

(72) Inventors: Eugenio Manuel Rojas Lopez, Toluca (MX); Rafael Soto Rojas, Toluca (MX)

(73) Assignee: GM Global Technology Operations LLC, Detroit, MI (US)

(*) Notice: Subject to any disclaimer, the term of this patent is extended or adjusted under 35 U.S.C. 154(b) by 128 days.

(21) Appl. No.: 15/341,595

(22) Filed: Nov. 2, 2016

(65) Prior Publication Data
US 2018/0119858 A1 May 3, 2018

(51) Int. Cl.
*F16L 37/084* (2006.01)
*B25B 27/10* (2006.01)

(52) U.S. Cl.
CPC ........... *F16L 37/0845* (2013.01); *B25B 27/10* (2013.01)

(58) Field of Classification Search
CPC .... F16L 37/0845; F16L 37/088; B25B 29/00; B25B 27/10
See application file for complete search history.

(56) References Cited

U.S. PATENT DOCUMENTS

| 5,909,901 A | 6/1999 | Zillig et al. |
| 2015/0145240 A1 | 5/2015 | Kujawski et al. |

*Primary Examiner* — John C Hong

(57) ABSTRACT

A tool for confirming the connection status of a fluid line to a quick-connect fluid coupling assembly includes a hub portion configured to interface with an outer portion of the fluid line, a finger coupled to the hub portion, a handle portion, a spring portion coupled to the hub portion and to the handle portion, and an indicating means. When the tool is placed in contact with the fluid line, a biasing force is applied to the tool in an axial direction, and a torque is applied to the handle portion to rotate the handle portion by a predetermined amount about the longitudinal axis of the fluid line, the finger cooperates with the retaining clip to produce a reaction torque to activate the indicating means when the fluid line is properly connected to the fluid coupling assembly.

16 Claims, 3 Drawing Sheets

QUICK CONNECTOR DETECTION TOOL AND METHOD

INTRODUCTION

The present disclosure generally relates to a tool and a method for confirming proper engagement of a quick-connect fluid coupling assembly.

The introductory description provided herein is for the purpose of generally presenting the context of the disclosure. Work of the presently named inventors, to the extent it is described in this introductory section, as well as aspects of the description that may not otherwise qualify as prior art at the time of filing, are neither expressly nor impliedly admitted as prior art against the present disclosure.

In the automotive industry, it is necessary to connect fluid lines to convey transmission oil from an automatic transmission to a cooler disposed within a vehicle radiator. Quick-connect couplings have been developed to allow rapid, tool-free assembly of fluid lines to transmissions. An example of such a quick-connect coupling is the Jiffy-tite® connector disclosed in U.S. Pat. No. 5,909,901 and in U.S. Patent Application Publication 2015/0145240, the disclosures of each of which are incorporated by reference in their entirety.

While quick-connect fluid coupling systems achieve their intended purpose there still remains a desire for improved systems and methods. More specifically, there is a desire for a detection tool that allows confirmation that the fluid line is properly engaged with its associated coupling.

SUMMARY

A tool is provided for confirming the connection status of a fluid line to a quick-connect fluid coupling assembly, in which the fluid line has a shoulder portion and the fluid coupling assembly includes a retaining clip and a body. The retaining clip has a plurality of protrusions, and the body defines a plurality of slots for receiving the protrusions such that the protrusions extend through the slots to engage the shoulder portion and secure the fluid line to the fluid coupling assembly when the fluid line is properly connected to the fluid coupling assembly. The tool includes a hub portion defining a locating surface configured to interface with an outer portion of the fluid line and at least one axially extending finger fixedly coupled to the hub portion. The tool further includes a handle portion and a spring portion coupled to the hub portion and to the handle portion. The spring portion is configured to allow relative rotational movement between the hub portion and the handle portion. The tool further includes an indicating means. In use, the tool is placed with the locating surface in contact with the outer portion of the fluid line, a sufficient biasing force is applied to the tool in an axial direction to force the finger to contact either the shoulder portion of the fluid line or the retaining clip, and a sufficient forcing torque is applied to the handle portion to rotate the tool by a predetermined amount about the longitudinal axis of the fluid line. When the fluid line is properly connected to the fluid coupling assembly the finger cooperates with the retaining clip to produce a reaction torque sufficient to deflect the spring portion and activate the indicating means.

In an exemplary embodiment, the tool further includes a first electrical contact fixedly connected to the hub portion and a second electrical contact fixedly connected to the handle portion. The first electrical contact is configured so as to be electrically connected to the second electrical contact when the reaction torque is sufficient to activate the indicating means, and so as to be electrically isolated from the second electrical contact when the reaction torque is insufficient to activate the indicating means.

In an exemplary embodiment, the indicating means includes an electrical circuit wired from the first electrical contact to the second electrical contact.

In an exemplary embodiment, the electrical circuit includes a battery.

In an exemplary embodiment, the electrical circuit includes a light source.

In an exemplary embodiment, the light source includes a light emitting diode.

In an exemplary embodiment, the electrical circuit further contains a current limiting device.

In an exemplary embodiment the current limiting device includes a resistor.

In another aspect of the disclosure, a method is provided for using a tool to confirm the connection status of a fluid line to a quick-connect fluid coupling assembly, in which the fluid line has a shoulder portion and the fluid coupling assembly has a retaining clip and a body. The retaining clip has a plurality of protrusions and the body defines a plurality of slots for receiving the protrusions such that the protrusions extend through the slots to engage the shoulder portion and secure the fluid line to the fluid coupling assembly when the fluid line is properly connected to the fluid coupling assembly. The tool includes a hub portion defining a locating surface configured to interface with an outer portion of the fluid line and at least one axially extending finger fixedly coupled to the hub portion. The tool further includes a handle portion and a spring portion coupled to the hub portion and to the handle portion. The spring portion is configured to allow relative rotational movement between the hub portion and the handle portion. The tool further includes an indicating means. The method includes steps of placing the tool with the locating surface in contact with the outer portion of the fluid line and applying a sufficient biasing force to the tool in an axial direction to force distal end of the finger to contact either the shoulder portion of the fluid line or the retaining clip. The method further includes the step of applying a sufficient forcing torque to the handle portion to rotate the tool by a predetermined amount about the longitudinal axis of the fluid line such that the finger cooperates with the retaining clip to produce a reaction torque sufficient to deflect the spring portion and activate the indicating means when the fluid line is properly connected to the fluid coupling assembly.

BRIEF DESCRIPTION OF THE DRAWINGS

The present disclosure will become more fully understood from the detailed description and the accompanying drawings, wherein.

DETAILED DESCRIPTION

Terms such as "above," "below," "upward," "downward," "top," "bottom," etc., are used descriptively for the figures, and do not represent limitations on the scope of the invention as defined by the appended claims.

Figure 1:
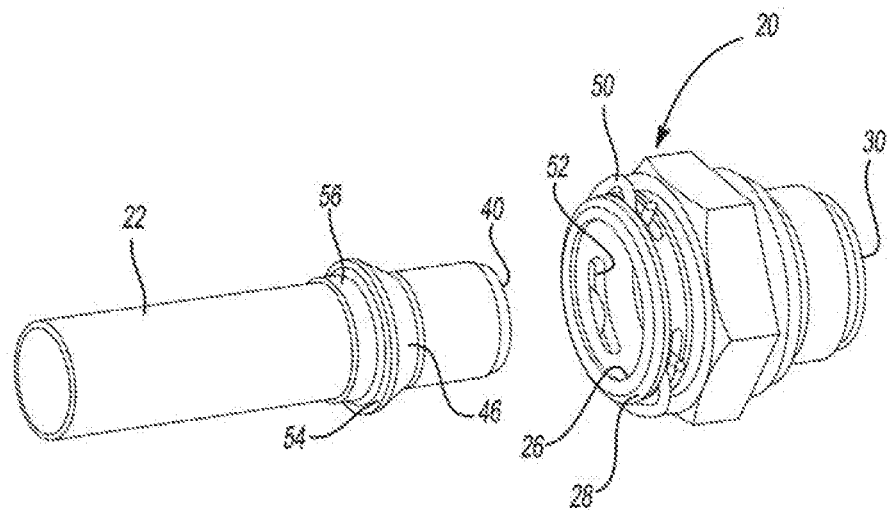
FIG. 1 is a depiction of a fluid line and a quick-connect fluid coupling assembly prior to engagement, according to an exemplary embodiment.
Figure 2:
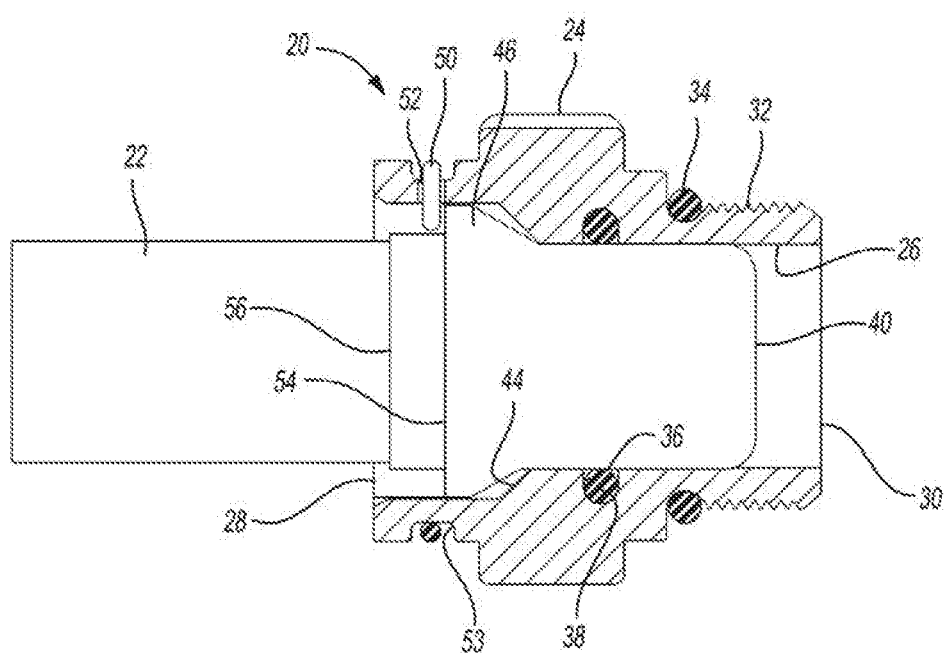
FIG. 2 is a depiction of a fluid line connected with a quick-connect fluid coupling assembly, according to an exemplary embodiment.

The present disclosure relates to a detection tool for confirming proper engagement of a fluid line in a quick-connect fluid coupling assembly. FIG. 1 and FIG. 2 depict a prior art fluid coupling assembly 20 for releasably attaching a fluid line 22 in fluid flow communication with an external housing or component, the detection tool being suitable for use therewith. FIG. 1 shows the fluid line 22 and fluid coupling assembly 20 prior to engagement, and FIG. 2 depicts a cross-section of the fluid coupling assembly 20 with the fluid line 22 attached therein.

The fluid coupling assembly 20 includes a body 24 with a through bore 26 extending from a first end 28 to a second end 30. The body 24 has external threads 32 extending from the second end 30 for threadingly coupling the body 24 to the external housing or component. A seal 34, such an O-ring, is mounted in an external recess on the body 24 generally adjacent to the end of the threads 32 for sealingly coupling the body 24 to an internal surface of a bore in the external housing.

An internal recess 36 receives an internal seal 38, such as O-ring, for sealingly coupling one end 40 of the fluid line 22 to the internal surface defining the bore 26 in the body 24.

The bore 26 in the body 24 is a stepped bore generally extending from a large diameter end portion adjacent the first end 28 of the body 24 through conical portion 44 to a smaller diameter cross-section extending to the second end 30.

Figure 3:
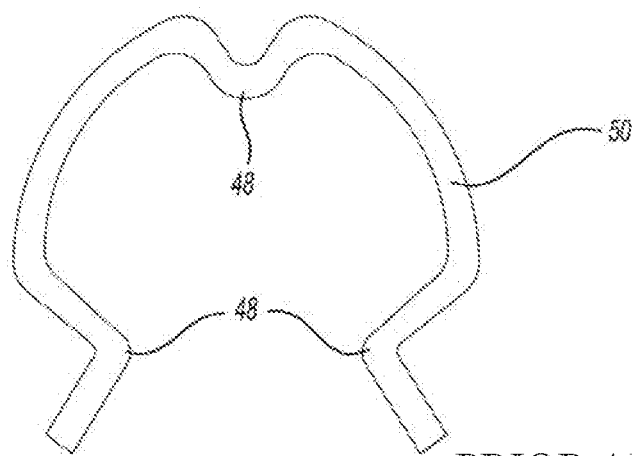
FIG. 3 is a depiction of a retaining clip used in a quick-connect fluid coupling assembly, according to an exemplary embodiment.

The fluid line 22 has a conical or enlarged flange 46 spaced from the one end 40 which seats within the conical portion 44 of the bore 26. The body 24 carries a retaining clip 50 externally in a clip receiving groove 53. The retaining clip 50 is generally circular in nature and is formed from a continuous piece of spring wire. The retaining clip 50 has a plurality of U-shaped protrusions 48 which extend radially inwardly as shown in FIG. 3.

As shown in FIG. 2, the protrusions 48 extend through slots 52 formed in the body 24 to snap behind a shoulder 54 on the flange portion 46 of the fluid line 22 to lock the fluid line 22 in the body 24. In this manner, the retaining clip 50 is capable of securing the fluid line 22 within fluid coupling assembly 20 even when axial forces are either externally applied or internally applied by the pressure of the fluid communicating through the fluid line 22. A seal band 56 may be provided to insure full seating of the fluid line 22 within the body 24.

In assembling the fluid line 22 to the body 24 of the fluid coupling assembly 20, the end 40 of the fluid line 22 is inserted into the first end 28 of the bore 26 in the body 24. The conical flange 46 on the fluid line 22 urges the protrusions 48 of the retaining clip 50 radially outward allowing the conical flange 46 to pass beyond the retaining clip 50 into the bore 26. The resiliency of the retaining clip 50 then allows the protrusions 48 of the retaining clip 50 to snap behind the shoulder 54 on the fluid line 22, locking the fluid line 22 in the body 24.

Figure 4:
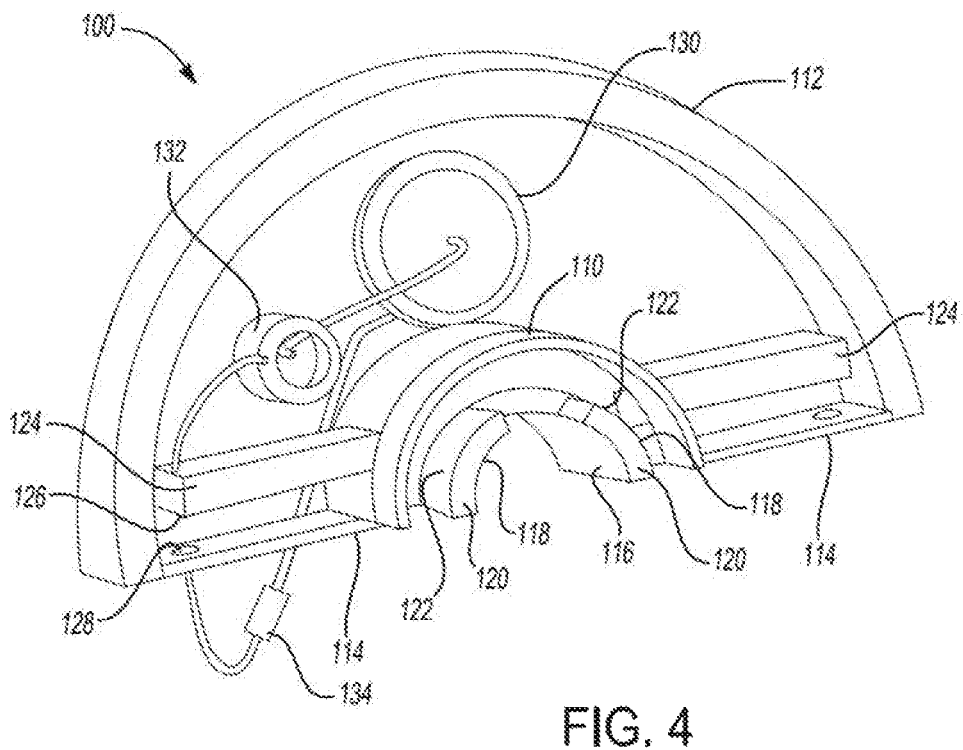
FIG. 4 is a depiction of a detection tool, according to an exemplary embodiment.
Figure 5:
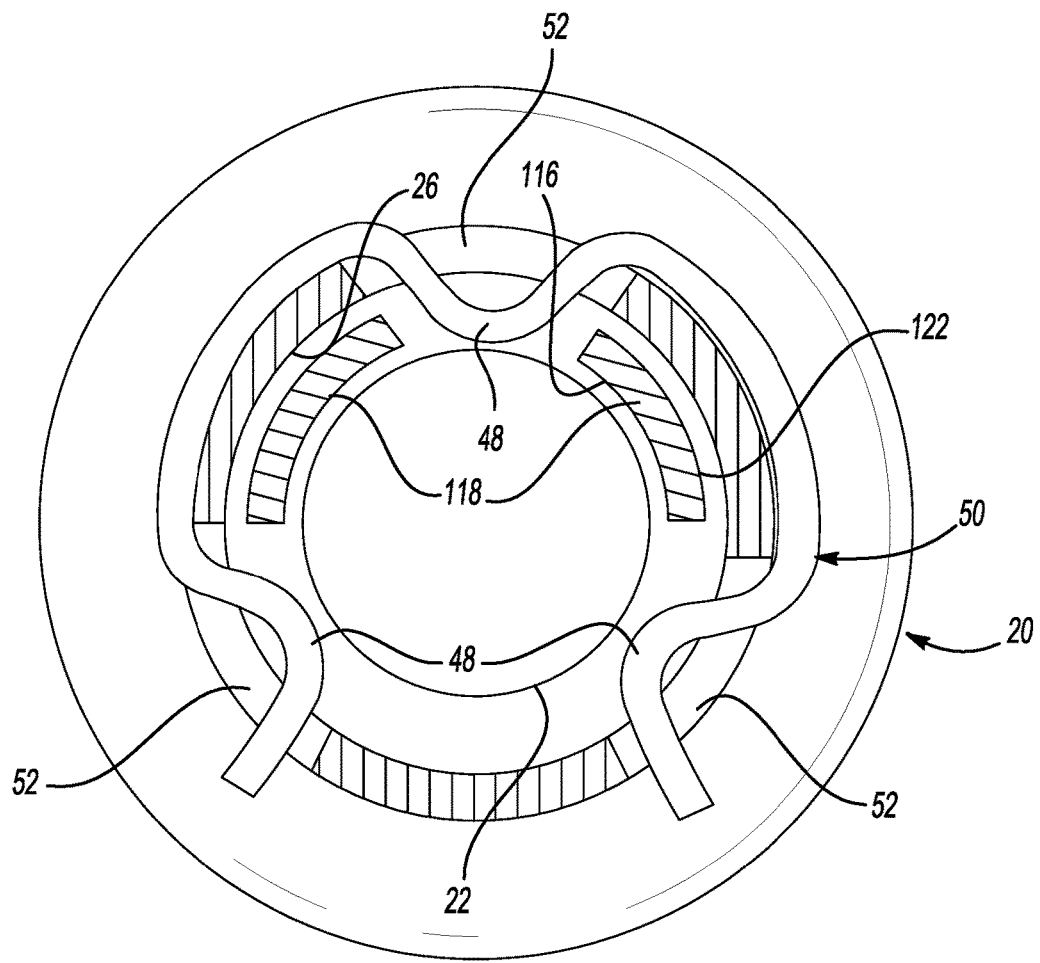
FIG. 5 is a depiction of elements of the detection tool of FIG. 4 positioned with a fluid line and quick-connect fluid coupling assembly, according to an exemplary embodiment.

Referring now to FIGS. 4-5, an exemplary embodiment a detection tool 100 is presented. The detection tool 100 is shown as broadly including a hub portion 110 and a handle portion 112, with a spring portion 114 connecting the hub portion 110 to the handle portion 112. In the embodiment shown, hub portion 110 and handle portion 112 appear as semi-circularly shaped members, when seen in end elevation.

The hub portion 110 defines a locating surface 116. In the embodiment shown, the locating surface 116 is a semi-cylindrical surface that has an inner radius slightly larger than the outer radius of the fluid line 22 so as to allow the locating surface 116 to control the radial location of the detection tool 100 relative to the fluid line 22. The hub portion 110 further includes at least one axially extending finger 118 having a distal end 120 situated away from the portion of the finger that is coupled to the hub portion 110. The embodiment depicted in FIG. 4 includes two fingers 118 arranged so as to define a notch therebetween. The outer surfaces 122 of each finger 118 define a portion of a cylinder concentric with the locating surface 116.

The spring portion 114 is configured to allow relative rotational movement between the hub portion 110 and the handle portion 112 when the handle portion 112 is urged to rotate about the longitudinal axis of the fluid line 22 and the hub portion 110 is constrained from rotating. In the exemplary embodiment of FIG. 4, at least one hub extension 124 is shown attached to the hub portion 110. A first electrical contact 126 is located on the hub extension 124, and a second electrical contact 128 is located on the spring portion 114. The first electrical contact 126 and the second electrical contact 128 are configured so as to touch one another when sufficient relative rotational movement between the hub portion 110 and the handle portion 112 occurs. In the exemplary embodiment of FIG. 4, the first electrical contact 126 and the second electrical contact 128 are part of an electrical circuit that includes a battery 130 and a light source 132. A current limiting device 134 is shown to provide current limiting if required by the light source 132, for example if the light source 132 is a light-emitting diode. While the embodiment of FIG. 4 depicts an indicating means that includes electrical contacts 126, 128, a battery 130, and a light source 132, it will be appreciated that alternative indicating means may be used with the detection tool 100. By way of non-limiting example, a non-contacting proximity detection means may be used in place of the electrical contacts 126, 128, a device producing an audible tone and/or a device configured to transmit a signal to a data logging means may be used in place of or in addition to the light source 132.

The outer surface of handle portion 112 may be provided with a knurled texture. This permits detection tool 100 to be more securely grasped and facilitates rotational movement of detection tool 100 when in use.

In use, the detection tool 100 is placed against a fluid line 22 that has its end 40 inserted into a fluid coupling assembly 20, with the locating surface 116 of the detection tool 100 in contact with the fluid line 22. The detection tool 100 is then translated axially along the fluid line 22 until the distal end 120 of at least one finger 118 abuts either a protrusion 48 of the retaining clip 50 or the shoulder 54. Determination of whether the distal end 120 first contacts a protrusion 48 of the retaining clip 50 or the shoulder 54 is random, depending on the initial orientation of the detection tool 100 relative to the orientation of the retaining clip 50. Detection tool 100 is then rotated about the longitudinal axis and urged axially toward the shoulder 54 on the fluid line 22 until the distal end 120 contacts the shoulder 54. The amount of rotation required to ensure that the distal end 120 contacts the shoulder is no more than the angle corresponding to the arc length of the finger 118. In the event that the fluid line 22 is properly installed in the fluid coupling assembly 20 and the initial abutment was against a protrusion 48 of the retaining clip 50, rotating the detection tool 100 while urging it axially toward the shoulder 54 will result in the finger 118 being positioned between adjacent protrusions 48 of the retaining clip 50, as shown in FIG. 5. The finger 118 has an arc length sufficiently small so as to fit between protrusions 48 of the retaining clip 50. The diameter of the outer surface 122 of the finger 118 is slightly less than the diameter of the fluid coupling assembly bore 26 at the first end 28. The handle portion 112 of the detection tool 100 is then rotated about the longitudinal axis of the fluid line 22 until a finger 118 contacts a protrusion 48. As torque continues to be applied to the handle portion 112, the hub portion 110 is constrained from rotating by the protrusion 48 contacting the finger 118. As a result, the finger 118 cooperates with the retaining clip 50 to produce a reaction torque sufficient to deflect the spring portion 114 and allow relative rotational motion between the hub portion 110 and the handle portion 112. This relative rotational motion allows the first electrical contact 126 and the second electrical contact 128 to touch, thereby activating the indicating means when the fluid line 22 is properly connected to the fluid coupling assembly 20.

The detection tool 100 allows recognition of a condition in which the fluid line 22 is not sufficiently inserted into the fluid coupling assembly 20 to allow the protrusions 48 of the retaining clip 50 to snap behind the shoulder 54 on the fluid line 22, as well as a condition in which the retaining clip 50 is missing from the fluid coupling assembly 20. Under either of these conditions, when the detection tool 100 is rotated while being urged axially toward the shoulder 54, the finger 118 will be in contact with the shoulder 54 but will not be in contact with protrusions 48 of the retaining clip 50. Continued rotation of the handle portion 112 will not result in sufficient deflection of the spring portion 114 to activate the indicating means, and no indication will be made of a proper connection between the fluid line 22 and the fluid coupling assembly 20.

The spring rate of the spring portion 114 and/or the force with which the detection tool 100 is pressed against the fluid line 22 is selected so as to prevent falsely indicating proper connection of the fluid line 22 to the fluid coupling assembly 20 due to friction between the hub portion 110 and the fluid line 22 in the absence of contact between a finger 118 and a protrusion 48. The spring rate of the spring portion 114 is further selected to ensure that the indicating means is activated before the fingers 118 urge the protrusions 48 to ride up onto outer surface 122 of fingers 118 and expand the retaining clip 50 radially and outwardly when detection tool 100 is rotated with respect to fluid coupling assembly 20.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

What is claimed is:

1. A tool for confirming a connection status of a fluid line to a quick-connect fluid coupling assembly, the fluid line having a shoulder portion and the fluid coupling assembly comprising a retaining clip and a body, the retaining clip having a plurality of protrusions and the body defining a plurality of slots for receiving the protrusions such that the protrusions extend through the slots to engage the shoulder portion and secure the fluid line to the fluid coupling assembly when the fluid line is properly connected to the fluid coupling assembly, the tool comprising:

a hub portion defining a locating surface configured to interface with an outer portion of the fluid line;

at least one axially extending finger having a first portion that is fixedly coupled to the hub portion, the finger having a distal end situated away from the first portion of the finger;

a handle portion;

a spring portion coupled to the hub portion and to the handle portion, the spring portion configured to allow relative rotational movement between the hub portion and the handle portion; and an indicating means;

such that, when the tool is placed with the locating surface in contact with the outer portion of the fluid line, when a sufficient biasing force is applied to the tool in an axial direction to force the distal end of the finger to contact either the shoulder portion of the fluid line or the retaining clip, and when a sufficient forcing torque is applied to the handle portion to rotate the tool by a predetermined amount about a longitudinal axis of the fluid line, the finger cooperates with the retaining clip to produce a reaction torque sufficient to deflect the spring portion and activate the indicating means when the fluid line is properly connected to the fluid coupling assembly.

2. The tool according to claim 1 further comprising a first electrical contact fixedly connected to the hub portion and a second electrical contact fixedly connected to the handle portion, the first electrical contact configured so as to be electrically connected to the second electrical contact when the reaction torque is sufficient to activate the indicating means and so as to be electrically isolated from the second electrical contact when the reaction torque is insufficient to activate the indicating means.

3. The tool according to claim 2 wherein the indicating means comprises an electrical circuit wired from the first electrical contact to the second electrical contact.

4. The tool according to claim 3 wherein the electrical circuit comprises a battery.

5. The tool according to claim 3 wherein the electrical circuit comprises a light source.

6. The tool according to claim 5 wherein the light source comprises a light emitting diode.

7. The tool according to claim 6 wherein the electrical circuit further contains a current limiting device.

8. The tool according to claim 7 wherein the current limiting device comprises a resistor.

9. A method for using a tool to confirm a connection status of a fluid line to a quick-connect fluid coupling assembly, the fluid line having a shoulder portion and the fluid coupling assembly comprising a retaining clip and a body, the retaining clip having a plurality of protrusions and the body defining a plurality of slots for receiving the protrusions such that the protrusions extend through the slots to engage the shoulder portion and secure the fluid line to the fluid coupling assembly when the fluid line is properly connected to the fluid coupling assembly;

the tool comprising a hub portion defining a locating surface configured to interface with an outer portion of the fluid line, at least one axially extending finger having a first portion that is fixedly coupled to the hub portion and having a distal end situated away from the first portion of the finger, a handle portion, a spring portion coupled to the hub portion and to the handle portion and configured to allow relative rotational movement between the hub portion and the handle portion, and an indicating means;

the method comprising the steps of:

placing the tool with the locating surface in contact with the outer portion of the fluid line;

applying a sufficient biasing force to the tool in an axial direction to force distal end of the finger to contact either the shoulder portion of the fluid line or the retaining clip; and applying a sufficient forcing torque to the handle portion to rotate the tool by a predetermined amount about a longitudinal axis of the fluid line such that the finger cooperates with the retaining clip to produce a reaction torque sufficient to deflect the spring portion and activate the indicating means when the fluid line is properly connected to the fluid coupling assembly.

10. The method according to claim 9 wherein the tool further comprises a first electrical contact fixedly connected to the hub portion and a second electrical contact fixedly connected to the handle portion, the first electrical contact configured so as to be electrically connected to the second electrical contact when the reaction torque is sufficient to activate the indicating means and so as to be electrically isolated from the second electrical contact when the reaction torque is insufficient to activate the indicating means.

11. The method according to claim 10 wherein the indicating means comprises an electrical circuit wired from the first electrical contact to the second electrical contact.

12. The method according to claim 11 wherein the electrical circuit comprises a battery.

13. The method according to claim 11 wherein the electrical circuit comprises a light source.

14. The method according to claim 13 wherein the light source comprises a light emitting diode.

15. The method according to claim 14 wherein the electrical circuit further contains a current limiting device.

16. The method according to claim 15 wherein the current limiting device comprises a resistor.

* * * * *